United States Patent [19]

Saunders

[11] 4,048,114
[45] Sept. 13, 1977

[54] METHOD OF MAKING COPPER CATALYST ON A SUPPORT

[75] Inventor: Kenneth Worden Saunders, Owen Sound, Canada

[73] Assignee: American Cyanamid Company, Stamford, Conn.

[21] Appl. No.: 735,486

[22] Filed: Oct. 26, 1976

[51] Int. Cl.$^2$ .................... B01J 21/04; B01J 23/72
[52] U.S. Cl. ................... 252/463; 252/476; 260/561 N
[58] Field of Search ............... 252/463, 476; 260/561 N

[56] References Cited

U.S. PATENT DOCUMENTS

| 3,338,666 | 8/1967 | Sanchez et al. | 252/463 X |
| 3,939,205 | 2/1976 | Kurata et al. | 260/561 N |

Primary Examiner—W. J. Shine
Attorney, Agent, or Firm—Gordon L. Hart

[57] ABSTRACT

In the making of reduced copper catalysts on supports such as alumina, cuprous salts are imbibed as aqueous solution in which solubility of the cuprous salt is increased by the presence of ammonium hydroxide and ammonium carbonate in the solution. The imbibed support is dried and the cuprous salt residue is reduced in situ by aqueous solution of sodium borohydride. The reduced copper catalyst product is useful for catalytic hydration of nitriles to produce amides, e.g. acrylonitrile to acrylamide.

8 Claims, No Drawings

METHOD OF MAKING COPPER CATALYST ON A SUPPORT

The invention relates to catalyst making and particularly to the making of catalysts having elemental copper on a support.

Copper catalysts having a high ratio of copper surface area to copper weight are excellent catalysts for the hydration of nitriles to produce corresponding amides. Thus acrylamide is produced by reacting acrylonitrile with water in contact with elemental copper. Finely divided copper has been used alone, without a support. That process involves slurrying the copper in a solution of the reactants to carry out the hydration reaction followed by a separation to recover the catalyst. A fixed-bed of copper catalyst on water-insoluble support particles provides a means for continuously contacting the reactants with the catalyst in a fixed bed, without the need for filtration or other means for separating the product from the catalyst.

The known catalyst making technique of imbibing a support such as alumina, silica or the like with an aqueous solution of metal salt, drying and then reducing the salt in situ is difficult with cuprous salts because of the low solubility of those salts in water. Cupric salts are readily soluble and can be used, but they require about twice as much reducing agent and would dissolve in aqueous reducing agents, e.g. aqueous $NaBH_4$. In water, cuprous chloride is soluble to less than one percent and is only slightly more soluble in ammonium hydroxide. In acid aqueous solutions, the solubility of cuprous chloride can be increased to about 20 to 25 percent but the acid in those solutions will react with some supports, particularly alumina, and so are unsuitable for the present use.

I have discovered that aqueous solutions with up to about 22 percent concentration of cuprous chloride can be prepared by means of cosolvents in the aqueous solution consisting of mixed ammonium hydroxide and ammonium carbonate. This copper concentration is higher than can be obtained using either of the ammonium bases as a solvent without the other.

The reason for the synergistic effect of the mixed bases in solubilizing the cuprous salt has not been determined; possibly a chelate is formed by the cuprous ion with ammonia and the carbonate ion. The basic solvent is suitable as an imbibing agent with most catalysts, and particularly with the preferred alumina supports.

The optimum ratio of the bases in the solution is about one part by weight ammonium carbonate to two parts ammonium hydroxide and the maximum cuprous chloride solubility is achieved by using near saturation concentration of the bases in water. Some increase of the cuprous salt solubility is obtained as the ratio of the ammonium bases is varied within the range from about three parts to about one part by weight of ammonium hydroxide per one part ammonium carbonate.

The following examples describe in detail several variations of the invention including the most preferred mode of carrying out the invention.

EXAMPLE 1

Alumina extrudates, 1/32 inch dia. × ca. ¼ inch long were heated to 140° ± 10° C. for several hours to remove loosely bound water while nitrogen was passed through the system. The dry, cool extrudates were soaked with a 19.8 percent cuprous chloride solution where the solvent was a 67/33 weight ratio of ammonium hydroxide (29 percent $NH_3$) to ammonium carbonate at near saturation in water. After overnight soaking, the solution was drained and nitrogen was passed through the system at room temperature for 4 hours during which time the surface moisture was removed and the catalyst temperature was about 10° C. due to evaporation. The semi-dry catalyst was removed and evaluated. It contained 7.9 percent copper.

Five grams of this was reduced with 0.326 g. of $NaBH_4$ in 32.5 ml of 0.669 N NaOH at about 5° C. After 1 hour of reduction, the reducing medium was decanted and the catalyst was washed four times with 100 ml of distilled water, twice with 0.1 N $NaHCO_3$ and three more times with distilled water. The pH of the final wash was 9.2. The solid catalyst contained 8.0 percent copper on a dry basis.

1.897 G. of the catalyst was contacted with an aqueour solution of acrylonitrile (conc. = 5.49 percent) at 57° C. for 1 hour. The conversion of acrylonitrile was 27.0 percent and the yield of acrylamide was > 99 percent based on the acrylonitrile converted.

EXAMPLE 2

Another catalyst precursor prepared as described in Example 1 was subsequently heated in a nitrogen stream for about 6 hours at 140° ± 10° C. until there was no further evidence of carbon dioxide. The material analyzed 8.5 percent copper. To 5.0 g. of this precursor there was added 0.117 g. of $NaBH_4$ in 35 ml of 0.669 N NaOH at about 5° C. After one hour of reduction, the liquid was decanted and washed four times with 100 ml of distilled water, twice with 0.1 N $NaHCO_3$ and three more times with distilled water. The pH of the final wash liquor was 9.7. The solid catalyst contained 9.6 percent copper on dry weight basis. 1.669 G. of the catalyst was contacted with an aqueous solution of acrylonitrile (conc. 5.18 percent) at 57° C. for 1 hour. The conversion of acrylonitrile with this catalyst in the test described in Example 1 was 30.7 percent and the yield of acrylamide was 98 percent based on the acrylonitrile converted.

EXAMPLE 3

This catalyst was prepared by a procedure the same as that described in Example 2 with some minor changes. The impregnating solution was 20.0 percent cuprous chloride solution in the same solvent. The alumina extrudates were exposed to the solution for about two hours and then dried overnight in a stream of nitrogen at 140° C. The dried catalyst contained 10.1 percent copper.

The conditions for reducing this catalyst precursor were as follows: dry catalyst, 99 g; reducing solution, 2.86 g. of $NaBH_4$ in 700 ml of 0.629 N NaOH; temperature 4° C; reduction time, one hour. The catalyst washing procedure was the same as in Example 2 with each wash volume being one liter. The final wash liquor had a pH of 10.3. The catalyst contained 9.1 percent copper on a dry basis. The activity of this catalyst was measured by contacting 2.089 g. of catalyst with a 5.64 percent solution of acrylonitrile at 57° C. for 1 hour. The conversion of acrylonitrile was 33.2 percent and the yield of acrylamide was 99+ percent based on the acrylonitrile converted.

EXAMPLE 4

Alumina containing higher copper concentrations may be obtained by successive impregnations. Alumina was impregnated with a solution containing 21.5 percent cuprous chloride in the same solvent composition as used in previous examples. After drying in the described manner it was impregnated again the second time and then dried. The copper concentration in this catalyst was 17.0 percent. For the reduction step, 5.0 g. of catalyst was exposed to 35 ml of 1.34 N NaOH containing 0.253 g. of $NaBH_4$ for 1 hour. The washing steps were identical to the previous examples. The final wash liquor had a pH of 9.3. The catalyst contained 21.7 percent copper on a dry basis. The activity of this catalyst was evaluated by exposing 1.614 g. of catalyst to a 5.27 percent acrylonitrile solution at 57° C. for 1 hour. The conversion of acrylonitrile was 42.2 percent and the yield of acrylamide was 95 percent based on the acrylonitrile converted.

In the foregoing examples the support material was pelleted alumina, and alumina may also be used in any of the several other forms in which alumina is available for making catalysts. Other water insoluble solid, porous catalyst supports can be impregnated with cuprous salts and those salts can be subsequently reduced on such other supports by the same techniques that are described in the foregoing examples with alumina supports. The synergistic increase of solubility is obtained with other cuprous salts, e.g. cuprous nitrate, which may be used instead of chloride if desired. Other variations and modifications which may not have been specifically mentioned are contemplated within the scope of the invention as defined in the claims that follow.

I claim:

1. In the method of catalyst making which comprises imbibing a catalyst support with aqueous solution of cuprous salt, evaporating the solvent and reducing the residual cuprous salt to elemental copper, the improvement wherein the solvent for the cuprous salt comprises both ammonium carbonate and ammonium hydroxide in combination in aqueous solution and the cuprous salt concentration in the solution is greater than the saturation concentration of the same cuprous salt in water alone or in a solution with either of the ammonium hydroxide or ammonium carbonate cosolvents used alone.

2. The improved method defined by claim 1 wherein the cuprous salt is cuprous chloride.

3. The improved method defined by claim 2 wherein the concentration of the ammonium bases in the solution is near the saturation centration of the mixture.

4. The improved method defined by claim 2 wherein the catalyst support is alumina.

5. The improved method defined by claim 1 wherein the ratio of ammonium hydroxide to ammonium carbonate is in the range from about 3 to 1 to about 1 to 1.

6. The improved method defined by claim 5 wherein the ratio of ammonium hydroxide to ammonium carbonate is about 2 to 1 and the mixed bases and the cuprous salt are dissolved to near the saturation concentrations in the solution.

7. The improved method defined by claim 5 wherein the support material is alumina.

8. The improved method defined by claim 2 wherein the step of reducing the residual cuprous salt is carried out by means of sodium borohydride as a reducing agent in aqueous solution.

* * * * *